(12) United States Patent
Scriffignano et al.

(10) Patent No.: US 7,392,240 B2
(45) Date of Patent: Jun. 24, 2008

(54) SYSTEM AND METHOD FOR SEARCHING AND MATCHING DATABASES

(75) Inventors: Anthony J. Scriffignano, Bethlehem, PA (US); David Allaway, Parsippany, NJ (US); Eric Gustafson, Palm Beach, FL (US); Amy Hayenhjelm, Murray Hill, NJ (US); Edward Ohlson, Bethlehem, PA (US); Courtney Shipman, Murray Hill, NJ (US); Larry Skahill, Parsippany, NJ (US); Sudip Chakraborty, New Providence, NJ (US); Ajay Pillai, New Providence, NJ (US)

(73) Assignee: Dun & Bradstreet, Inc., Short Hills, NJ (US)

( * ) Notice: Subject to any disclaimer, the term of this patent is extended or adjusted under 35 U.S.C. 154(b) by 377 days.

(21) Appl. No.: 10/702,114

(22) Filed: Nov. 5, 2003

(65) Prior Publication Data

US 2004/0220918 A1 Nov. 4, 2004

Related U.S. Application Data

(60) Provisional application No. 60/424,789, filed on Nov. 8, 2002.

(51) Int. Cl.
*G06F 17/30* (2006.01)
*G06F 7/00* (2006.01)
(52) U.S. Cl. .............................. 707/3; 707/4
(58) Field of Classification Search ............. 707/3, 707/4, 5
See application file for complete search history.

(56) References Cited

U.S. PATENT DOCUMENTS

| | | | | |
|---|---|---|---|---|
| 5,659,731 A | * | 8/1997 | Gustafson | 707/4 |
| 5,819,291 A | | 10/1998 | Haimowitz et al. | 707/201 |
| 5,960,430 A | * | 9/1999 | Haimowitz et al. | 707/6 |
| 6,026,398 A | | 2/2000 | Brown et al. | 707/5 |
| 6,311,178 B1 | | 10/2001 | Bi et al. | 707/3 |
| 6,643,640 B1 | * | 11/2003 | Getchius et al. | 707/3 |
| 6,817,018 B1 | * | 11/2004 | Clarke et al. | 719/313 |

(Continued)

FOREIGN PATENT DOCUMENTS

EP 1139264 10/2001

(Continued)

OTHER PUBLICATIONS

Stevens, WR: "Interprocess Communication," Jan. 23, 1990, pp. 87-170.

(Continued)

*Primary Examiner*—Sam Rimell
*Assistant Examiner*—Alicia M Lewis
(74) *Attorney, Agent, or Firm*—Ohlandt, Greeley, Ruggiero & Perle, L.L.P.

(57) ABSTRACT

A system and method for finding a business entity in a database that matches input data. A web services interface accepts a match request and provides a best match. A pre-processing layer cleans, parses, and standardizes input data into terms. An application layer includes a match engine for processing the match request using the terms. The match engine evaluates and scores match candidates from the database to provide the best match and, optionally, an ordered list of match candidates.

20 Claims, 17 Drawing Sheets

U.S. PATENT DOCUMENTS

| | | | |
|---|---|---|---|
| 2002/0124015 A1* | 9/2002 | Cardno et al. | 707/204 |
| 2003/0061211 A1 | 3/2003 | Shultz et al. | 707/3 |
| 2003/0225725 A1* | 12/2003 | Miller et al. | 701/1 |
| 2004/0019593 A1* | 1/2004 | Borthwick et al. | 707/4 |
| 2004/0036716 A1* | 2/2004 | Jordahl | 345/713 |
| 2004/0158562 A1* | 8/2004 | Caulfield et al. | 707/5 |
| 2006/0074991 A1* | 4/2006 | Lussier et al. | 707/200 |

FOREIGN PATENT DOCUMENTS

| | | |
|---|---|---|
| WO | 00/57258 | 9/2000 |
| WO | 01/35301 | 5/2001 |
| WO | 01/61605 | 8/2001 |
| WO | WO 01/73623 | 10/2001 |
| WO | 01/90909 | 11/2001 |

OTHER PUBLICATIONS

Chaudhuri, S., "An Overview of Query Optimization in Relational Systems," Microsoft Research, Redmond, Washington Jan. 6, 1998, pp. 34-43.

Horrell, S., "Microsoft Message Queue (MSMQ)," Enterprise Middleware, Jun. 1999, pp. 25-35.

Supplementary Partial Search Report dated Nov. 2, 2007 corresponding to European Patent Application No. 03789726.1.

* cited by examiner

Fig. 6

| OBJECTIVE |
|---|
| * Remove all special characters e.g. ~, @, /, *, , etc. |
| * Remove last work if found in list of standard company forms e.g., INC., LTD, CORP, Co |
| * Capitalize - convert all text to uppercase |
| * Depluralize - content plurals to singular, e.g., Communications Communication, Chairs Chair |
| * Standardize words - e.g. International, Internal (all forms of international) to INTL |
| * Normalize Phrases - e.g. 1st VP, VP Legal, V P to VP |
| * Extract street number and street name form address line - e.g. 888 Yellowstone Rd gives 888 (street number) - Yellowstone (street name) |

— 48

| INPUT |
|---|
| * Raw Inquiries |
| - Name |
| - Address line |
| - City |
| - Zip |
| - Phone |
| - CEO name |
| - State |
| - DUNS |
| - National ID |

— 50

| OUTPUT |
|---|
| * Cleaned Inquiry |
| - Clean name |
| - Words |
| - Street number |
| - Street name |
| - Vanity street name |
| - City |
| - Vanity city |
| - Zip city |
| - State |
| - Phone |
| - CEO name |
| - DUNS |
| - National ID |
| - PO Box |
| - Lat/long |

— 52

| OBJECTIVE |
|---|
| * Retrieve candidates optimally that are likely to be matches<br>* ~100 Candidates average<br>* Max 1000 candidates<br>* ~400 msec average<br>* ~2 sec max |

64

| INPUT |
|---|
| * Cleaned Inquiry<br>  - Clean name<br>  - Words<br>  - Street number<br>  - Street name<br>  - Vanity street name<br>  - Zip city<br>  - State<br>  - Phone<br>  - CEO name<br>  - DUNS<br>  - National ID<br>  - PO Box<br>  - Lat/long |

66

| OUTPUT |
|---|
| * Candidates<br>  - DUNS<br>  - Name<br>  - St number<br>  - St name<br>  - City<br>  - Zip<br>  - Phone<br>  - Lat / Long<br>  - State<br>  - CEO Name<br>  - PO Box<br>  - PO Box |

SYSTEM AND METHOD FOR SEARCHING AND MATCHING DATABASES

CROSS-REFERENCE

The present application claims priority to U.S. Provisional Application Ser. No. 60/424,789 filed on Nov. 8, 2002.

BACKGROUND OF THE INVENTION

In database processing systems, the user desires to have efficient, high speed access and search capabilities for data stored in the database. Crucial to this objective is the ability to enable fast retrieval of the correct data sought by means operating to find a match without having to search through each data element stored on each record.

Conventional database processing systems seek a match between input business data and stored data as set forth in U.S. Pat. No. 5,659,731, which is incorporated in its entirety by reference thereto. The '731 patent describes a system that accepts a given search entity from a user and utilizes a database to identify a possible matching entity from a large list of entries. The '731 patent also discloses a method which provides for evaluating the reliability of the matching entity. Preferably, the method is carried out with minimal human intervention. A user inputs a plurality of attributes to identify a given entity, the system identifies a possible matching entity, and assigns a numerical grade to reflect the match quality of each attribute. Thereafter, the method assigns a grade to each attribute score, assembles the grades into a key, uses the key to address a memory, and retrieves a confidence code or quality indicator from the memory. The confidence codes are based on empirical information and reflect the overall quality of the match for the particular entity.

Systems of the foregoing type are well known. For instance, in the credit industry, credit history information on a given business entity being considered for credit is typically processed through a commercially available database. A user may input the name of a business entity into a processor connected to the database, which then locates that given entity in the database and retrieves its credit history information.

The credit history information is then used to make a decision on whether to grant or withhold credit for the given entity.

To simplify matters with a simple example, assume that the user has an interest in making a sale on credit to XYZ Corp., which is located at a particular address in a particular city. XYZ Corp. is the "given entity," or "given entry." After the user inputs this identifying information, the database is searched and an entry for XYZ Corp. located at a different address in the same city is identified from the database. A determination must then be made as to whether the identified XYZ Corp. is the same as the given entity XYZ Corp. If the determination is that they are the same, then the credit information from the database for the identified XYZ Corp. is used in making the credit decision for the transaction with the given entity.

Database systems such as these have far reaching applications beyond credit industry applications as illustrated above. In another illustration, a wholesale distribution entity may periodically distribute product information documents to retail entities. The costs associated with these documents may range from inexpensive product brochures (e.g., 50 cents each) to relatively costly product catalogs (e.g., $5.00 each). In order to save costs, since thousands of these product information documents may be distributed, the wholesale distribution entity may wish to direct the more expensive catalogs to those retailers having a high sales volume, and the less expensive brochures to retailers having a low volume of sales. In this application, the database system would be accessed to identify sales information on certain entities, as opposed to credit history information.

As will become apparent from the discussion that follows, the present invention is useful in broad-ranging applications, including both of the foregoing illustrations. In order to better explain the concepts and teachings on the present invention, however, the illustrations provided hereinafter will generally focus on the credit industry application presented above.

Business entities are typically listed in a database by what can be called attributes. The most common attributes are those which identify the entity, such as the business name and location. Location can be broken down into a number of attributes which include street number, street name, P.O. box number, city, town or the like, state (if in the U.S.) or country, and telephone number. These are common attributes which are found in many commercial databases reporting information on business entities. Other attributes are, however, sometimes utilized.

When it is desired to find a match for a given entity within such a list of business entities, inconsistencies in listing information can create matching problems. In some instances, inconsistencies can result from erroneous information stored in the database itself, and also from erroneous information input when identifying a given entity for whom a match is desired. In other instances, inconsistencies may result merely due to differing styles (e.g., abbreviations) used to identify certain attributes.

Credit departments typically have procedures for dialing up databases and obtaining credit information. Usually, the identification process is rather straightforward, and may be performed automatically. However, because of the different styles of stating names and addresses and the different care which is exercised by a large number of people in collecting information, the correlation between a given entity and the possible matching entities in the database do not always match precisely. When this occurs, human intervention is often necessary to make the intermediate determination as to which one of the one or more identified entities matches the given entity, before the ultimate determination of whether to grant or withhold credit can be made. Proper intermediate identification is particularly important in large dollar transactions. The human intervention usually involves either making an on-the-spot judgment as to the correct match, or making follow-up phone calls to investigate or verify the given entity.

Based on the amount of time required to verify the identity of a given entity, and the cost associated with the human (e.g., credit manager, clerk, etc.) who makes those decisions, it will be found that this somewhat mundane step in the credit approval procedure can consume a significant amount of dollar resources. Indeed, in situations where a large number of such credit decisions are made, it is found to be commercially feasible to isolate a subset of justifiable risks (i.e., those where a reliable match is made), and grant credit to those risks without the need for human intervention.

There are generally available processes and procedures, and commercially available software packages for determining a "best fit" match for any given entity within a large compilation or list of entities. For example, a system known as Soundex is well known and has long been used to find words that sound similar but are spelled differently. Similarly, a system known as AdMatch was used to help people find the proper 1970 census tract, using a base address.

In the credit industry, systems like the foregoing are used by credit reporting agencies to identify a list of possible matching entities and numerically score the match of the identifying attributes (name, address, city, etc.) for each entity identified. More particularly, automated matching systems are available, which parse, normalize, and further process a given entry to identify likely matches. These systems can also provide attribute-by-attribute information, such as a numerical score, reflecting the reliability of the match of each attribute. Thus, a user might be faced with an attempted match where the name matches exactly and thus has a 100% score, the street address has a 63% score, the town 79%, and the phone number a no entry condition. But, again, human intervention is usually required as a credit manager, clerk, or other appropriate person must examine the entries, the scores, and the overall context of the request in order to determine whether the information provided by the credit database indeed matches the characteristics of the given entity.

More sophisticated systems are known, wherein the individual attribute scores are weighted by factors based on empirical data to produce a composite score. These systems have been less than effective in the past, and it is typically found that programmers are continuously adjusting weighting factors to accommodate new conditions. As additional empirical data is collected, the weighting algorithm be further refined. Thus, it can be appreciated that the weighting function or algorithm is a ever-changing device. Unfortunately, while the newly adjusted weighting factors may accommodate a new condition successfully, they often unexpectedly and adversely affect other computations, and accurate matching problems persist.

The unique fuzzy matching system according to the present invention creates a tunable, self-directing approach that focuses on those algorithmic components that are most likely to yield positive results. This system enhances all online and batch matching environments, and significantly increases data throughput. The present invention also provides the following advantages over conventional matching systems: (1) enhanced reference database; (2) advanced approaches to retrieve keys including geo-coding and advanced name scoring; (3) improved presentation of candidates for online decisioning; (4) enhanced decisioning criteria and communication about how a match was performed; and (5) focused measurement of match performance at critical internal touchpoints as well as customer-facing metrics.

SUMMARY OF THE INVENTION

One aspect is a method of searching and matching input data to stored data. Input data is received that has a plurality of elements and represents a business entity. Selected elements are converted to a set of terms. Based on the terms, stored data is searched for a plurality of match candidates. A best match is provided from the match candidates.

In some embodiments, converting elements to terms includes parsing, cleaning, and standardizing steps. The elements are parsed to identify the terms, including a company name and an address. The terms are cleaned, including removing extraneous words and the terms are standardized. In some embodiments, converting includes validating, correcting, and assigning steps. An address having a street name and city name is validated. The street name and city name are corrected, if necessary. A zip code, a latitude, and a longitude are assigned to the set of terms. In some embodiments, converting also includes maintaining at least one reference table. In some embodiments, additional converting is performed. Special characters in the terms are removed. A last word in the company name is removed if it is a standard company form. The text in the terms is converted to uppercase. Select text in the terms is depluralized. Select words in the terms is standardized. Select phrases in the terms are normalized. A street number and a street name are extracted from the address.

In some embodiments, searching includes several more steps. A plurality of keys are generated from the terms. Match candidates are limited for certain keys that return counts surpassing a predetermined threshold. A cost function is generated for select key intersections. Key intersections are prioritized according to the cost function. Match candidates are retrieved in order of the key intersections. In some embodiments, a confidence score is generated for each match candidate based on a degree of match.

In some embodiments, an ordered list is provided of selected match candidates based on their confidence score. In some embodiments, the confidence score is based on comparison scoring. In some embodiments, comparison scoring has additional steps. A score is determined for a business name, a street name, and a city name in a pair. The pair is the terms and one of the match candidates. The pair is classified into data segments using a decision tree. Logistic modeling is performed using the data segments. A match probability is determined for the pair. A grade is assigned to the pair. In some embodiments, comparison scoring includes determining a uniqueness score based on the number of matching business names in the city name. In some embodiments, comparison scoring includes calculating a business density score for the pair. In some embodiments, comparison scoring includes calculating a zip score. In some embodiments, comparison scoring includes calculating an industry score by matching words in the business name to standard industrial classification (SIC) key words.

Another aspect is a system for searching and matching input data to stored data comprising a web services interface, a pre-processing layer, an application layer, and a database layer. The web services interface accepts a match request and provides a best match. The match request includes input data representing a business entity. The pre-processing layer has a cleaning, parsing, and standardizing component for converting the input data into a set of terms. The application layer has a match engine for processing the match request using the set of terms and produces the best match. The database layer retrieves match candidates from stored business entity information for the application layer. In some embodiments, the match engine comprises a decisioning component. The decisioning component determines the best match and an ordered list of match candidates. In some embodiments, the web services interface also provides an ordered list of match candidates from the application layer. In some embodiments, the system also comprises a plurality of memories, asynchronous message queues, and caching systems. These are in the pre-processing, application, and database layers.

Another aspect is a computer readable medium having instructions for performing a method of searching and matching input data to stored data. A match request is received. The match request has a plurality of elements representing a business entity. The elements are pre-processed to convert them into a set of terms. Match candidates are retrieved by searching a database based on the set of terms. The match candidates are evaluated to determine a best match and the best match is provided. In some embodiments, pre-processing elements comprises additional steps. The elements are parsed to identify the set of terms, including a company name and an address. The terms are cleaned, including removing extraneous words and the set of terms is standardized. In some embodiments, retrieving match candidates comprises additional steps. A plurality of keys are generated from the terms.

Match candidates are limited for certain keys that return counts surpassing a predetermined threshold. Key intersections are prioritized according to a cost function. Match candidates are retrieved in order of the key intersections. In some embodiments, evaluating match candidates includes additional steps. A score is determined for a business name, a street name, and a city name in a pair. The pair is the set of terms and one of the match candidates. A uniqueness score is determined based on the number of matching business names in the city name. A business density score and zip score are calculated for the pair. An industry score is calculated by matching words in the business name to standard industrial classification (SIC) key words.

BRIEF DESCRIPTION OF THE DRAWINGS

The accompanying drawings incorporated in and forming a part of the specification, illustrate several aspects of the present invention, and together with the description serves to explain the principles of the invention. In the drawings:

FIG. 6 is a diagram depicting the objective, input and output of the cleaning, parsing and standardization step of FIG. 3;

FIG. 8 is a diagram depicting the objective, input and output of the candidate retrieval step of FIG. 3;

DETAILED DESCRIPTION OF PREFERRED EMBODIMENTS

Figure 1:
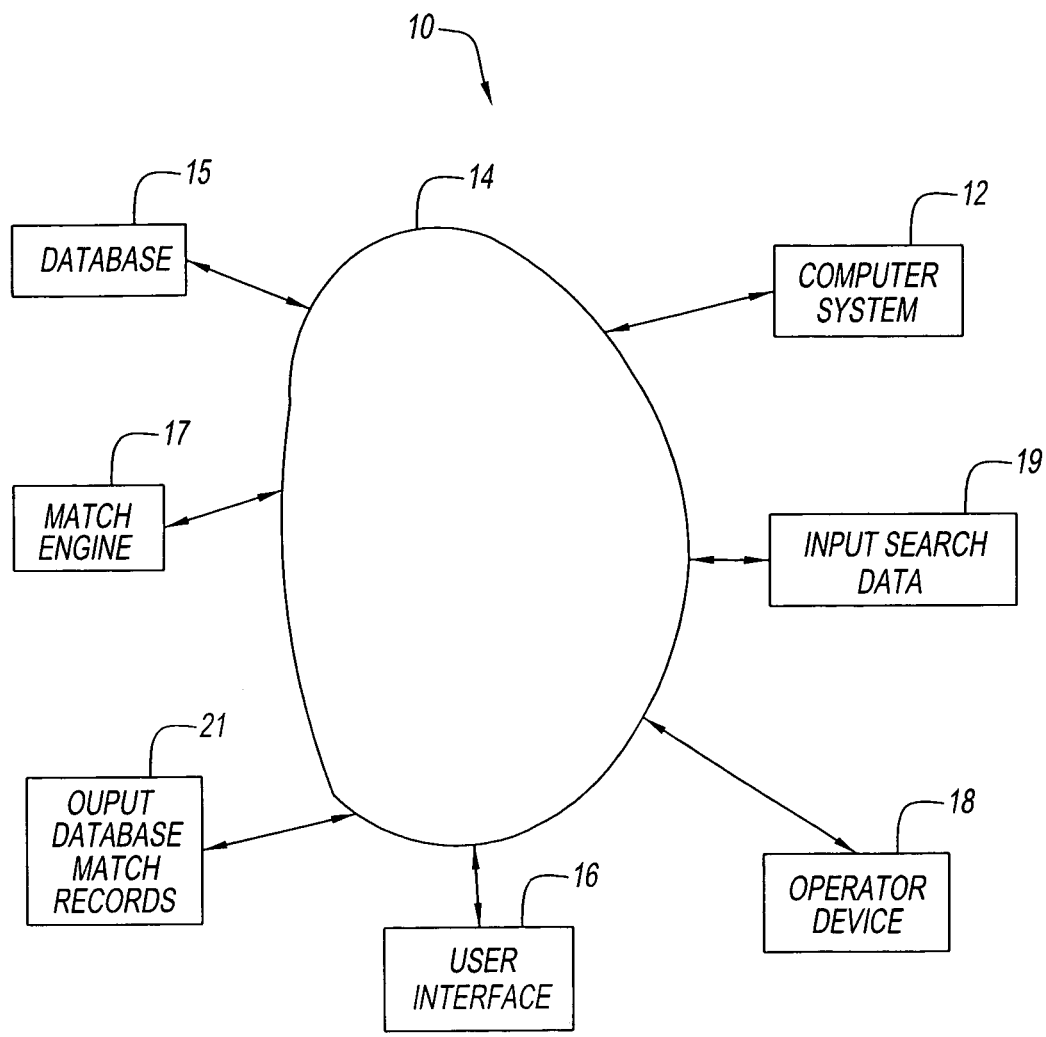
FIG. 1 is a block diagram of a system, preferably including a network, for carrying out the basic process of the search and match system of the present invention.

Referring now to FIG. 1, there will be seen a communication system 10 which includes a computer system 12, a communication network 14, a database 15, a match engine 17, input search data 19, output database match records 21, and a user interface 16, The communication network may be any wired or wireless network capable of conducting communication between functional modules.

The user interface may be connected in the case where a suitable customer device may be chosen for operation. In addition to access through the communication network by use of the user interface, there is also provided an operator device 18, seen in FIG. 1, such that a service operator may gain access by way of the network 14 to the input data source and to all the other functional modules and components, including the computer system 12 so that a vendor may operate to accomplish the searching and matching task at hand for a customer.

Figure 2:
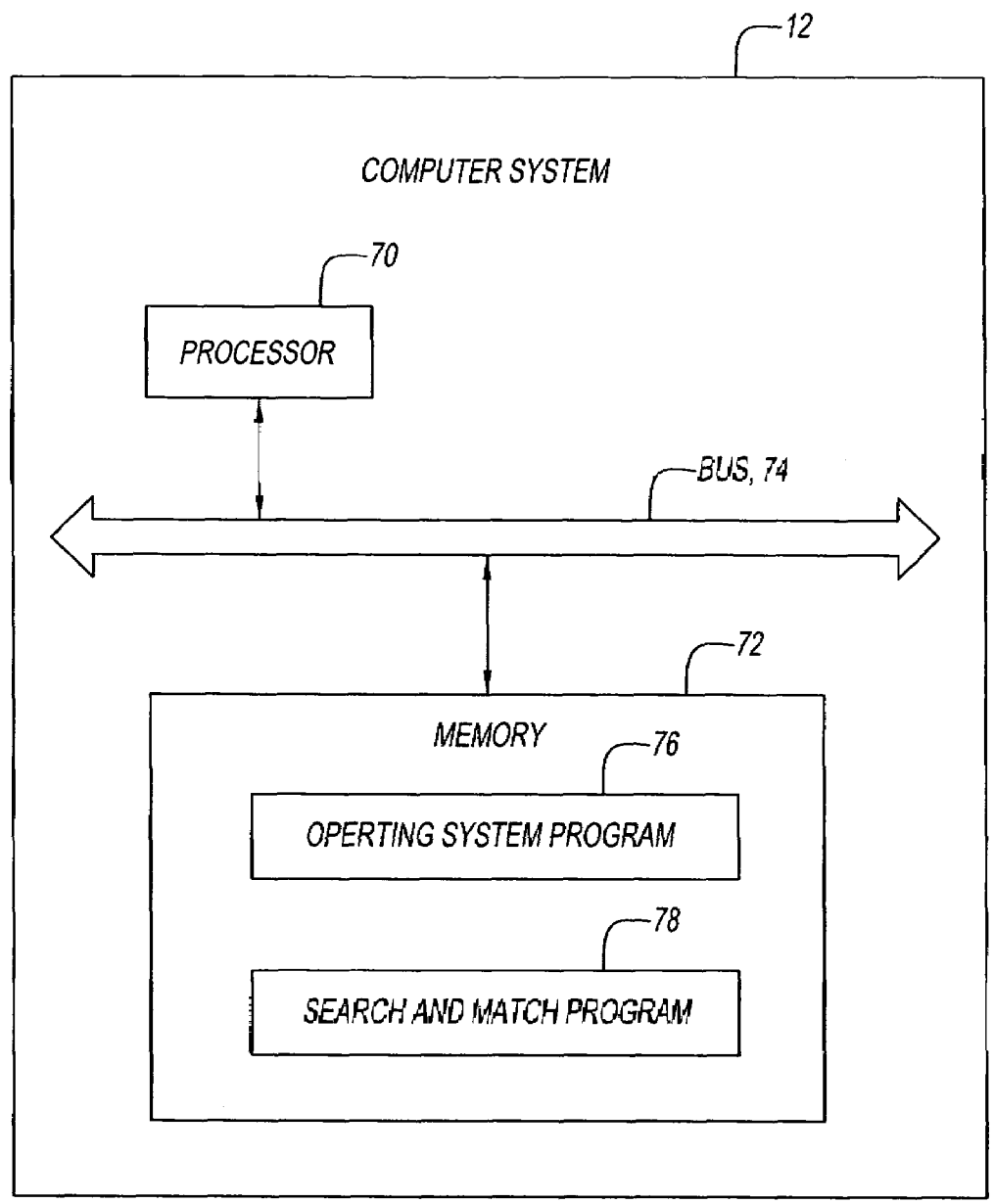
FIG. 2 is a block diagram depicting the arrangement by means of a suitable program for accomplishing or fulfilling the process of the present invention.

It will be understood by reference to FIG. 2 that the operating system program 76 and the search and match program 78 are stored in memory 72 so that they may be utilized in the running the system to accomplish the heretofore noted objectives. Conventional components in the form of processor 70 and a bus bar 74 for connecting inputs and outputs to the computer system are also depicted in FIG. 2.

Figure 3:
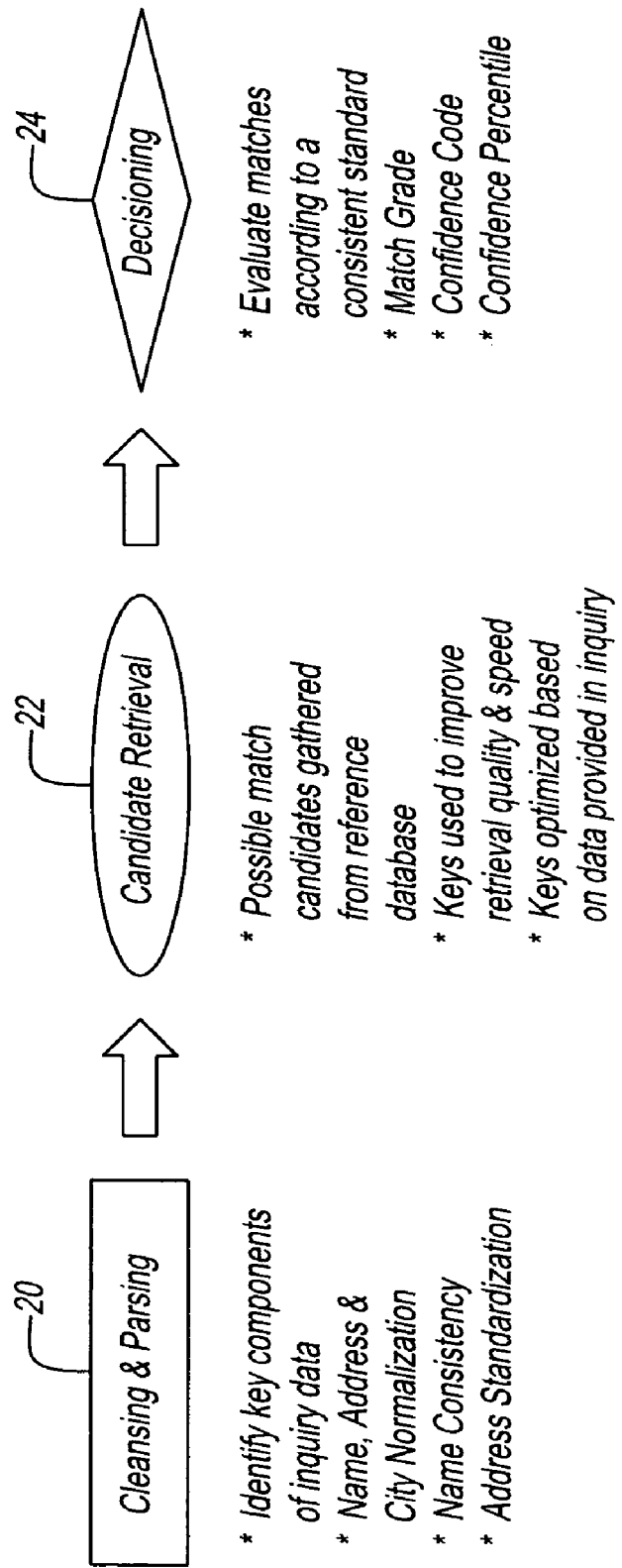
FIG. 3 is a diagram the three step process of cleaning and parsing, candidate retrieval and decisioning according to the present invention.

FIG. 3 is a schematic representation of the decision making operation according to the present invention, wherein each inquiry data is cleansed and parsed 20, followed by candidate retrieval 22 and finally a decision 24. Cleansing and parsing step 20 involves (a) identification of key components of the inquiry data, (b) name, address and city normalization, (c) name consistency, and (d) address standardization. The candidate retrieval step 22 involves (a) gathering of possible match candidates from the reference database, (b) use of keys to improve retrieval quality and speed, and (c) optimization of keys based on data provided during inquiry. The decisioning step 24 involves (a) evaluation of matches according to a consistent standard, (b) matchgrade processing, (c) confidence coding, and (d) confidential percentile generation.

Figure 4:
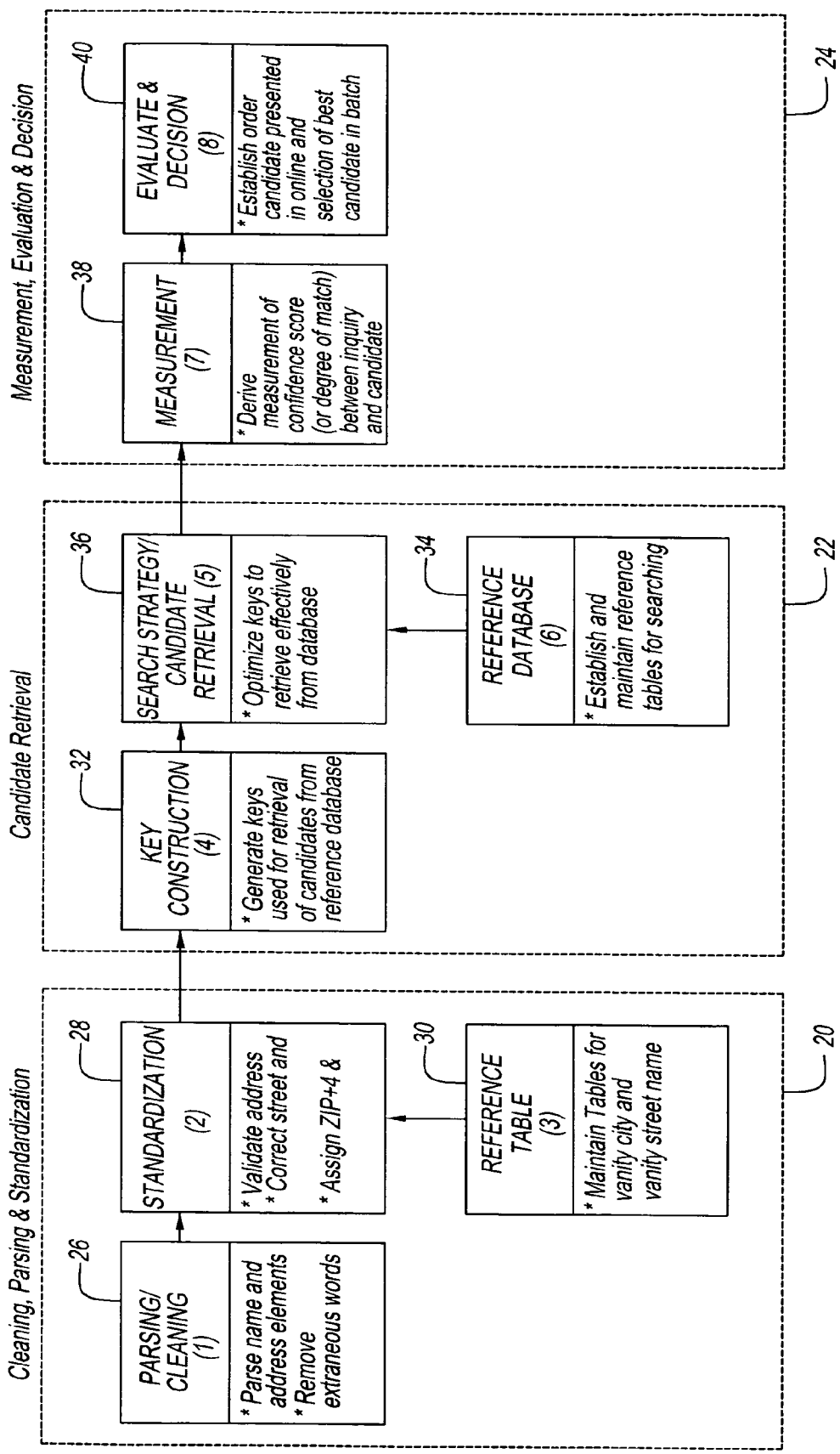
FIG. 4 is a block diagram detailing the individual steps which occur in the three step process describe in FIG. 3.

FIG. 4 is a block diagram which more specifically describes the decision making operation of the present invention, wherein cleaning and parsing step 20 requires the parsing of name and address elements and removal of extraneous words in step 26. The parsed and cleaned name and address elements are then standardized in step 28 which validates the address, check to determine if the street and city names are correct, and assigns a zip code plus 4 and latitude/longitude. Standardization step 28 checks with reference table 30 which maintains a database of tables for vanity city and vanity street names.

The candidate retrieval step 22 in FIG. 4 received the cleaned, parsed and standardized data from step 20 for which it then generates keys 32 used for retrieval of candidates from reference database 34. Thereafter, the keys are optimized to retrieve 36 effectively from reference database 34. Reference database 34 establishes and maintains reference tables for searching by key construction 32 and search strategy/candidate retrieval 36.

Candidate retrieval step 22 is followed by measurement, evaluation and decision step 24, wherein the data from step 22 is measured 38 and then evaluated and decided upon in sub step 40. Measurement sub step 38 involves the development of a measurement of confidence score (or degree of match) between an inquiry and a candidate. This information is then sent to evaluation and decision sub step 40 which establishes an order for which each candidate is presented in online and selection of the best candidate in the batch.

Figure 5:
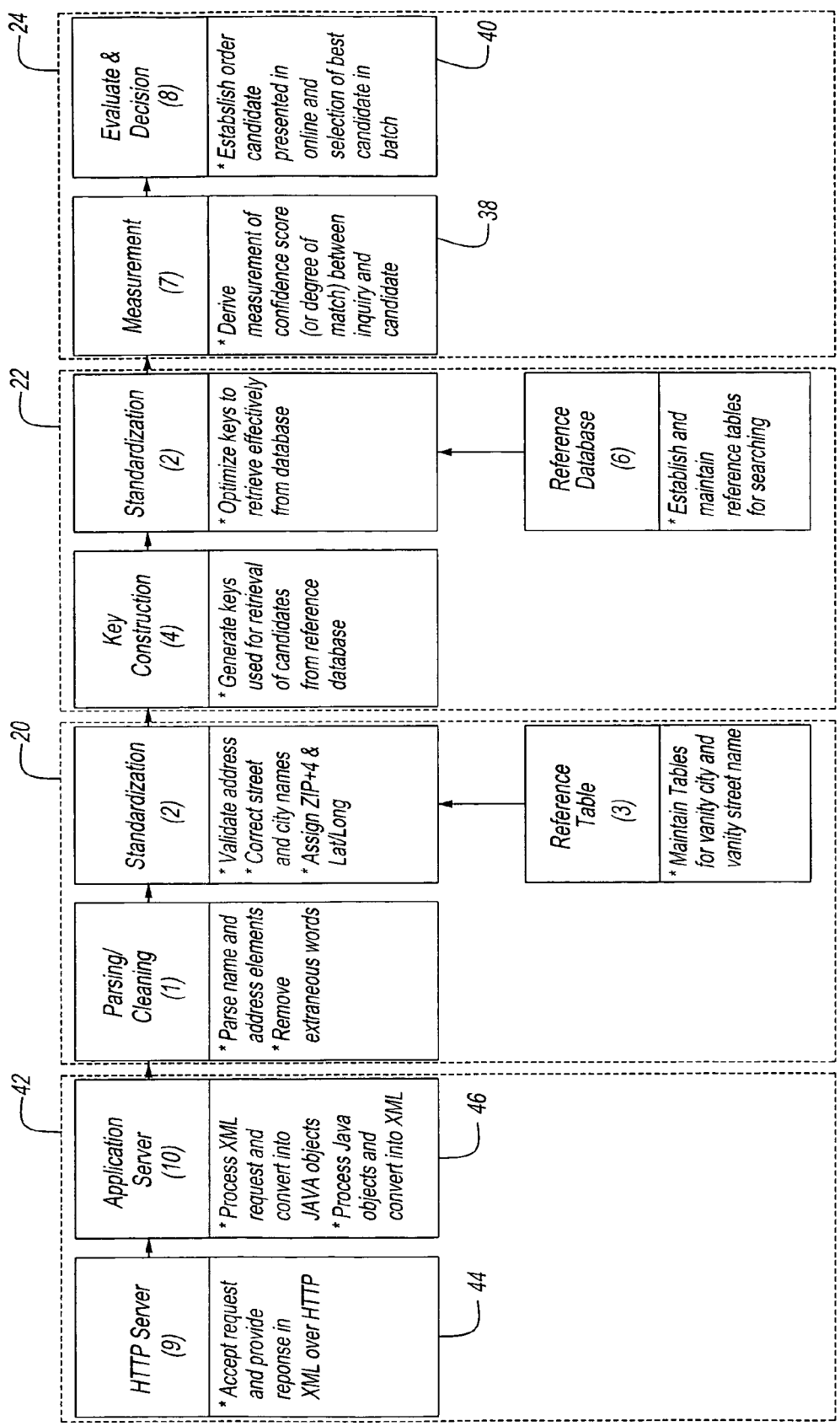
FIG. 5 is a block diagram similar to FIG. 4 and including the step of connecting to a web service.

FIG. 5 is a similar block diagram to FIG. 4, above, but also depicts the connection of the web services 42 to cleaning, parsing and standardization step 20. Web services 42 includes an HTTP server 44 which accepts requests for data and application server 46 which processes XML requests an converts them into JAVA objects. Application server 46 also processes JAVA objects and converts such JAVA objects into XML format before forwarding to cleaning, parsing and standardization step 20.

Figure 7:
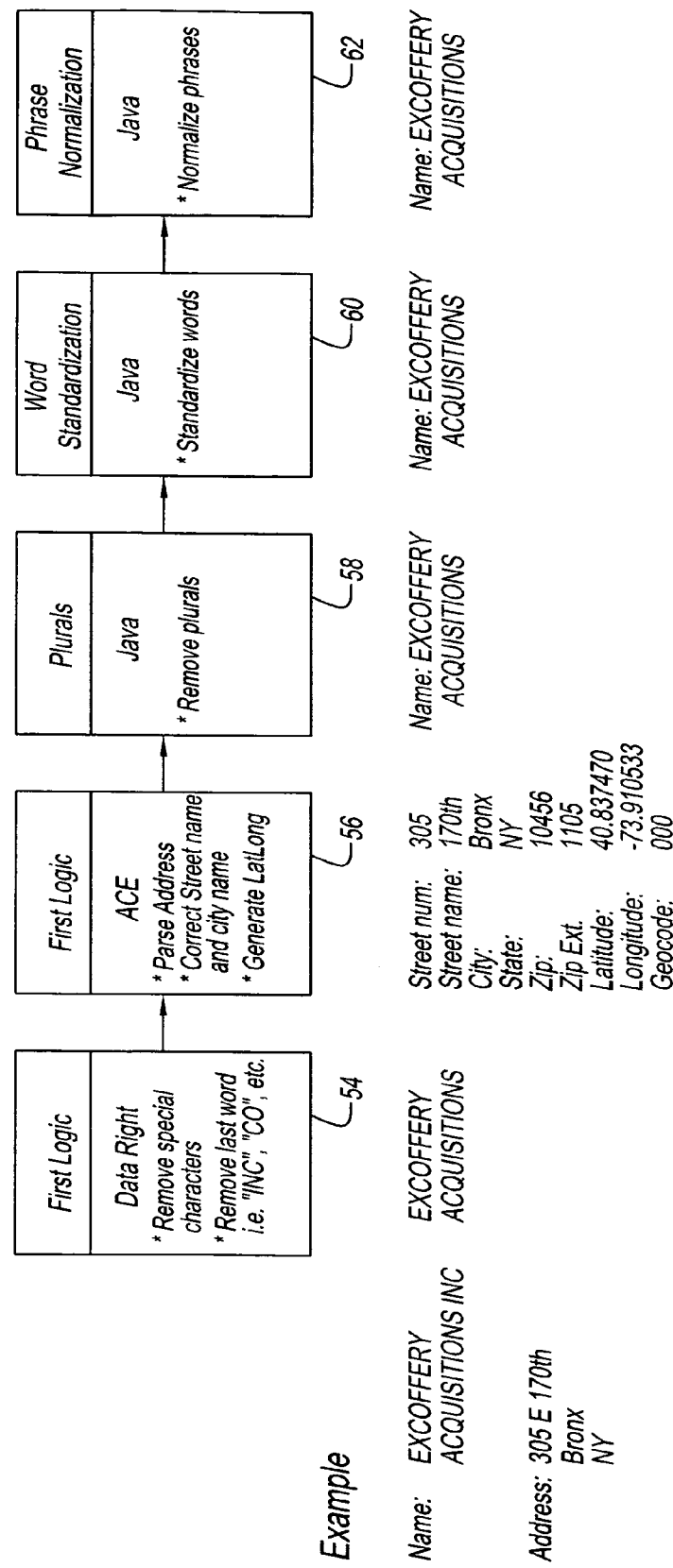
FIG. 7 is a block diagram depicting the cleaning, parsing and standardization data flow of FIG. 6.

FIGS. 6 and 7 are block diagrams detailing the subroutines required for the cleaning, parsing and standardization step 20. In particular, FIG. 6 describes the objectives 48, e.g., remove all special characters (e.g., ~, @, /, *, etc.), the input 50, e.g., raw inquiries, and the output 52, e.g., cleaned inquiry. FIG. 7 demonstrates the data flow in step 20, wherein first logic data right step 54 removes the special characters, first logic ACE step 56 then parse and corrects the street address and generates latitude/longitude, plurals step 58 removes plurals, word standardization step 60 standardizes words, and phrase normalization step 62 normalizes phrases.

Figure 9:
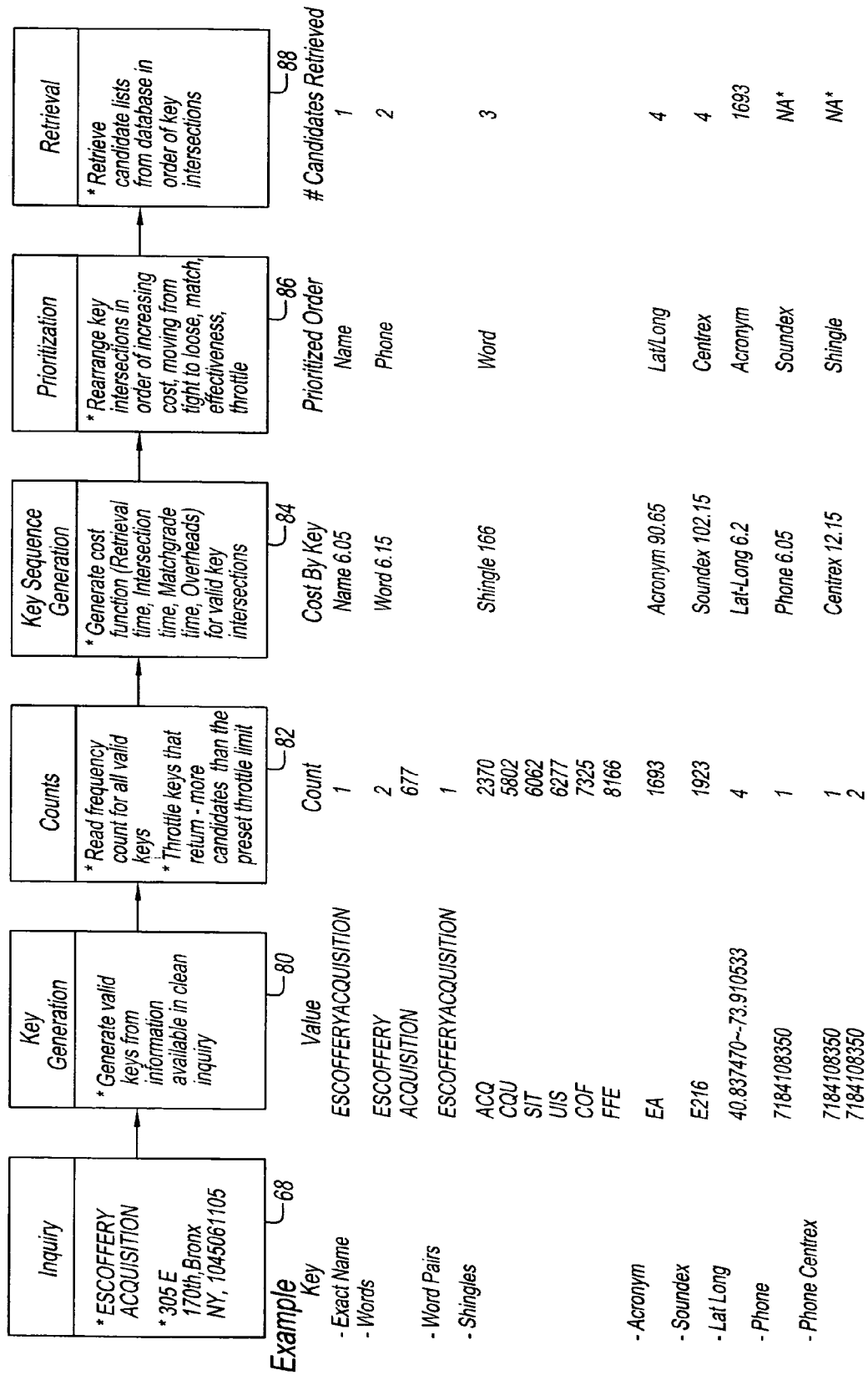
FIG. 9 is a block diagram depicting the candidate retrieval data flow of FIG. 8.

FIGS. 8 and 9 are block diagrams detailing the subroutines required for the candidate retrieval step 22. In particular, FIG. 8 defines the objective 64, e.g., retrieve optimal candidates that are likely to be matches, input 66 for cleaning inquiry, and output 67 for generating matched candidates. FIG. 9 demonstrates the data flow in step 22, wherein inquiry step 68 involves Escoffery Acquisition, key generation step 80 which generates valid keys from information available from a clean inquiry, count step 82 which reads frequency counts for all valid keys and throttles keys that return more candidates than the present throttle limit, key sequence generation step 84 which generates cost function (e.g., retrieval time, intersection time, matchgrade time and overheads) for valid key intersections, prioritization step 86 which rearranges key intersections in order of increasing cost, moving from tight to loose, match, effectiveness and throttle, and retrieval step 88 which retrieves candidate lists from database in order of key intersections.

Figure 10:
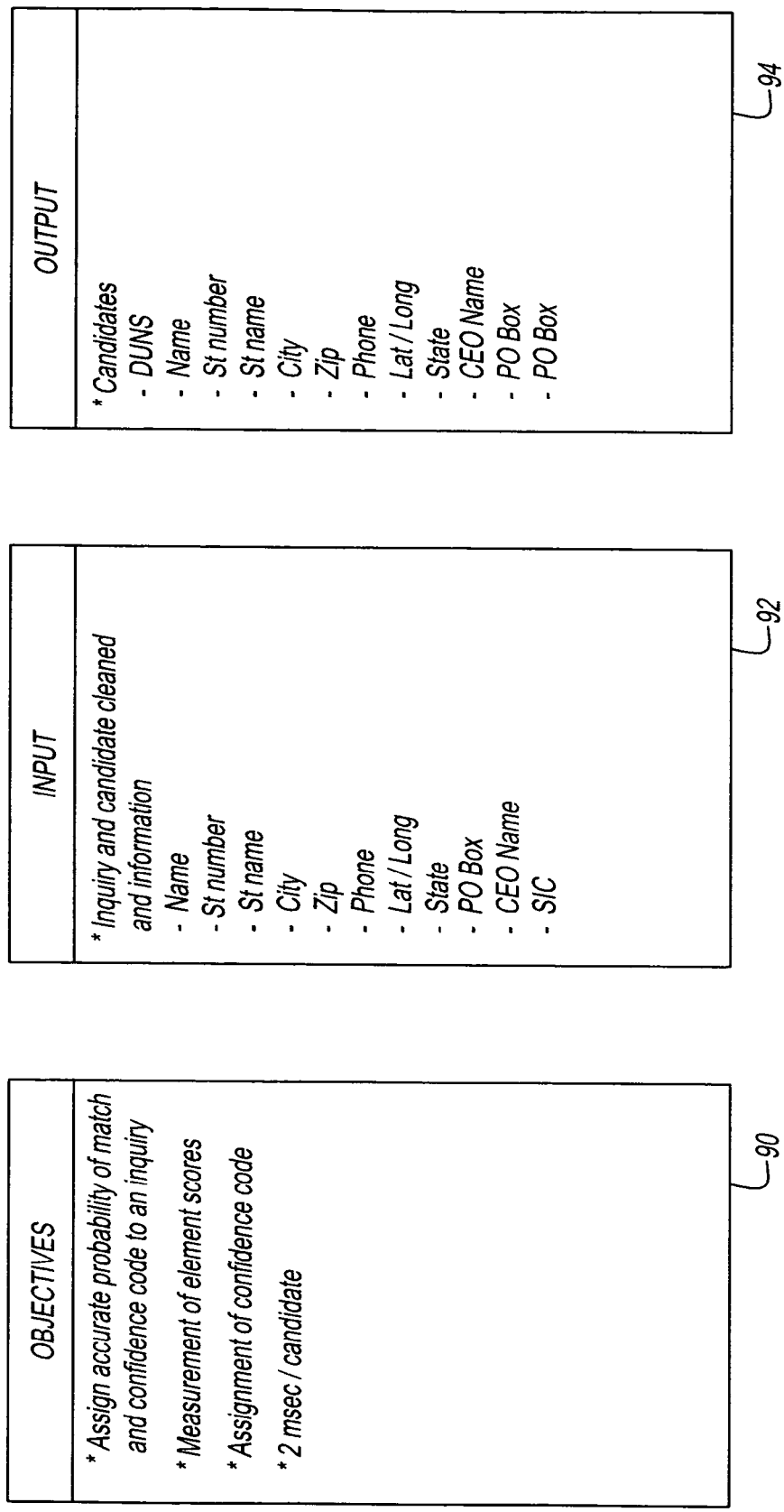
FIG. 10 is a diagram depicting the objective, input and output of the measurement, evaluation and decision step of FIG. 3.
Figure 11:
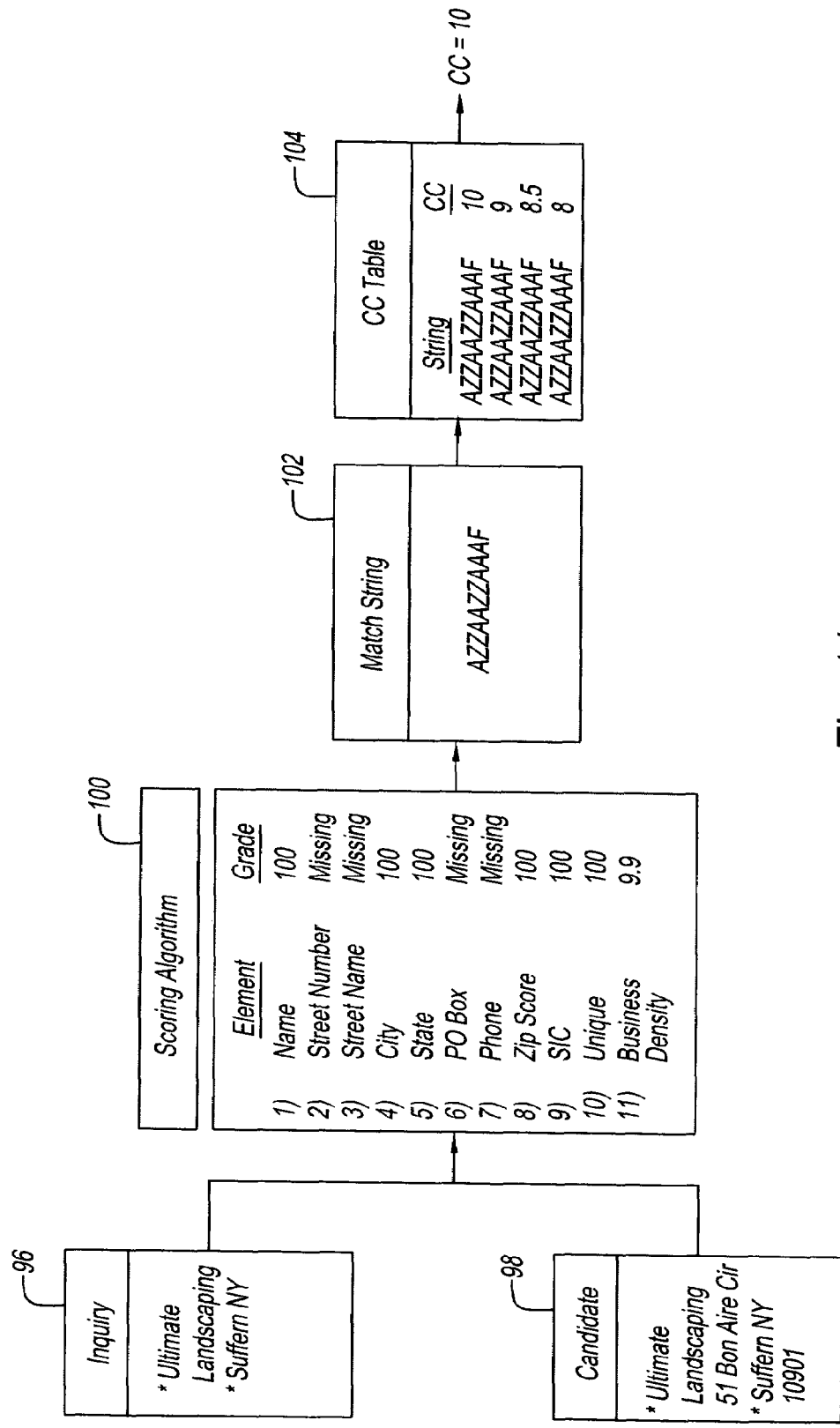
FIG. 11 is a block diagram depicting the measurement, evaluation and decision data flow of FIG. 10.

FIGS. 10 and 11 are block diagrams detailing the subroutines required for measurement, evaluation and decision step 24. In particular, FIG. 10 describes the objectives 90 for assigning accurate probability of match and confidence code to an inquiry candidate pair by measurement of element score, assignment of confidence code and 2 msec/candidate, input 92 which cleans inquiry and candidate information, and output 94 which provides eleven element scores via match string, MDP and confidence code and probability. FIG. 11 involves the data flow of step 24, wherein inquiry data 96 and candidate data 98 are sent to scoring algorithm 100 for grading. The graded inquiry and candidate data is then sent from scoring algorithm 100 to match string 102 and confidence code (CC) table 104.

Figure 12:
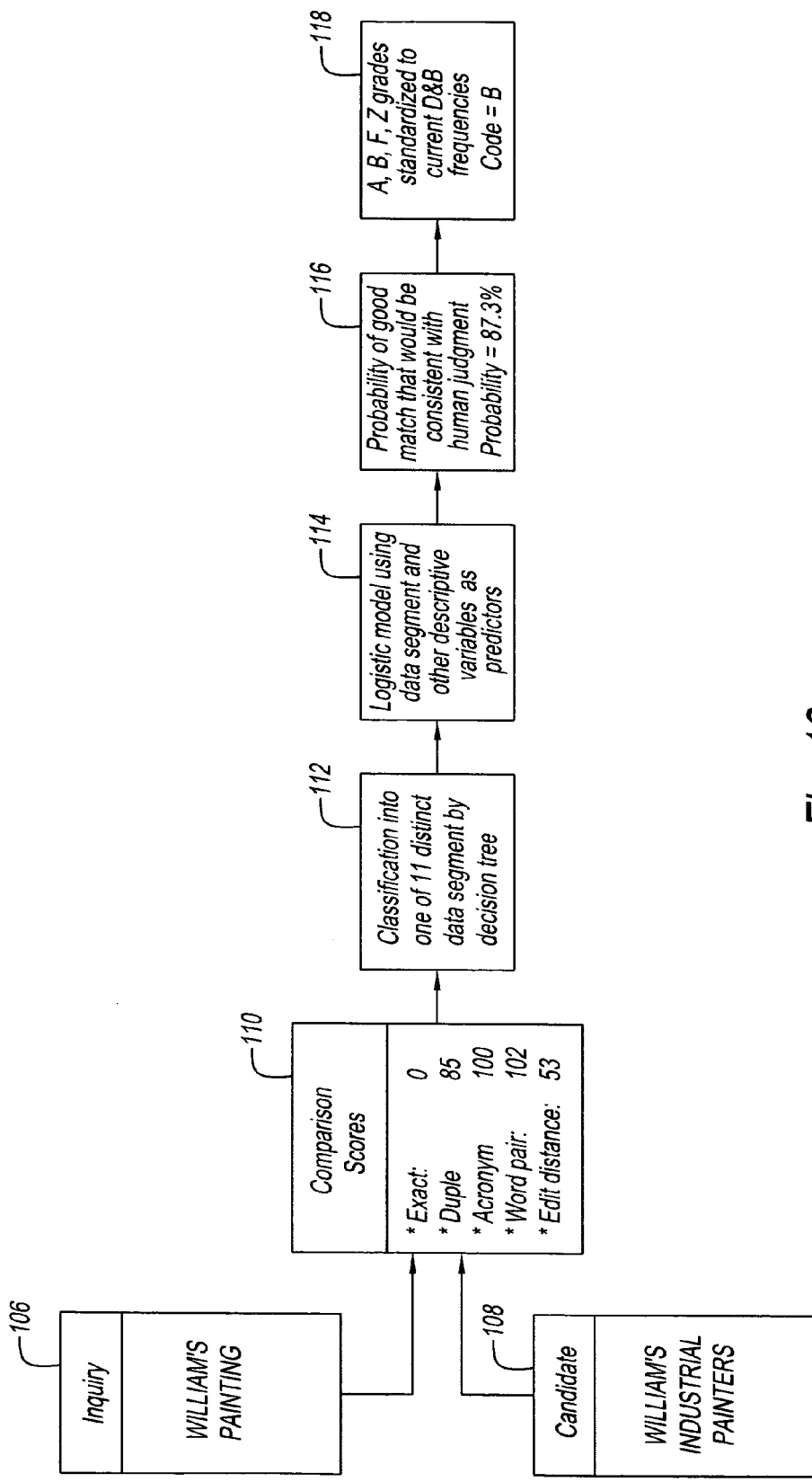
FIG. 12 is a block diagram of a name score model according to the present invention.

FIG. 12 demonstrates a preferred name scoring model for use with business names, street name and city name. Inquiry data 106 and candidate data 108 are sent for comparison scoring 110 followed by classification 112 into one of eleven distinct data segments by means of a decision tree, logistic modeling 114 which uses data segments and other descriptive variables as predictors, probability analysis 116 where the probability of good match that would be consistent with human judgment is determined, and A, B, F, Z grading 118 where the grading is standardized to convention frequencies.

Figure 13:
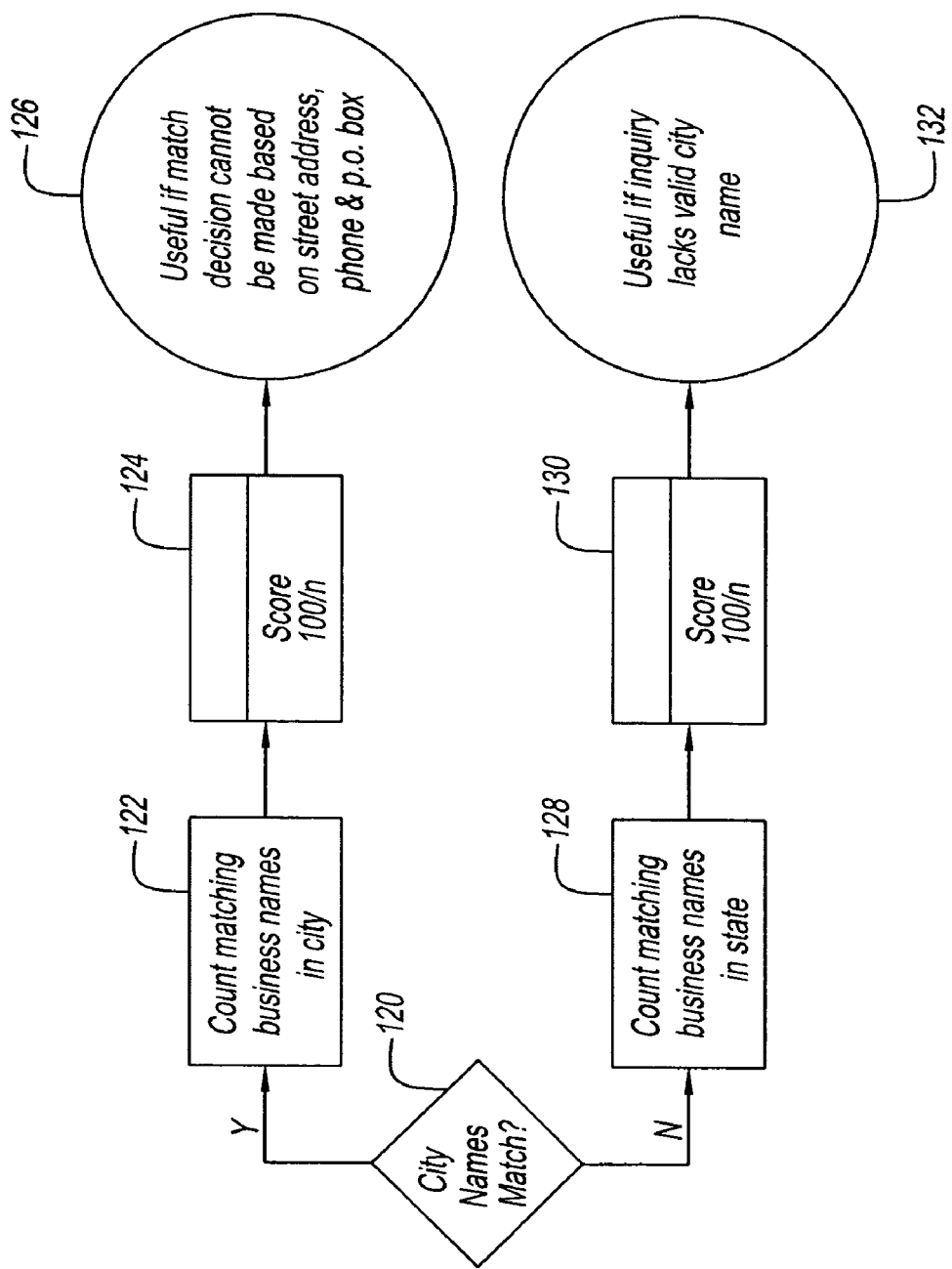
FIG. 13 is a block diagram of a uniqueness score model according to the present invention.

FIG. 13 is a logic diagram for uniqueness score pertaining to, for example, city name matches. The uniqueness score works as follows. If the city names match 120 then count matching business names in city 122 and score 124 the number of matches based upon 100. This is useful if match decision cannot be made based on street address, phone and post office box 126. If the city name does not match 120, then count matching business names in state 128 and score 130 the number of matches based upon 100. This is useful if the inquiry lacks valid city name 132.

Figure 14:
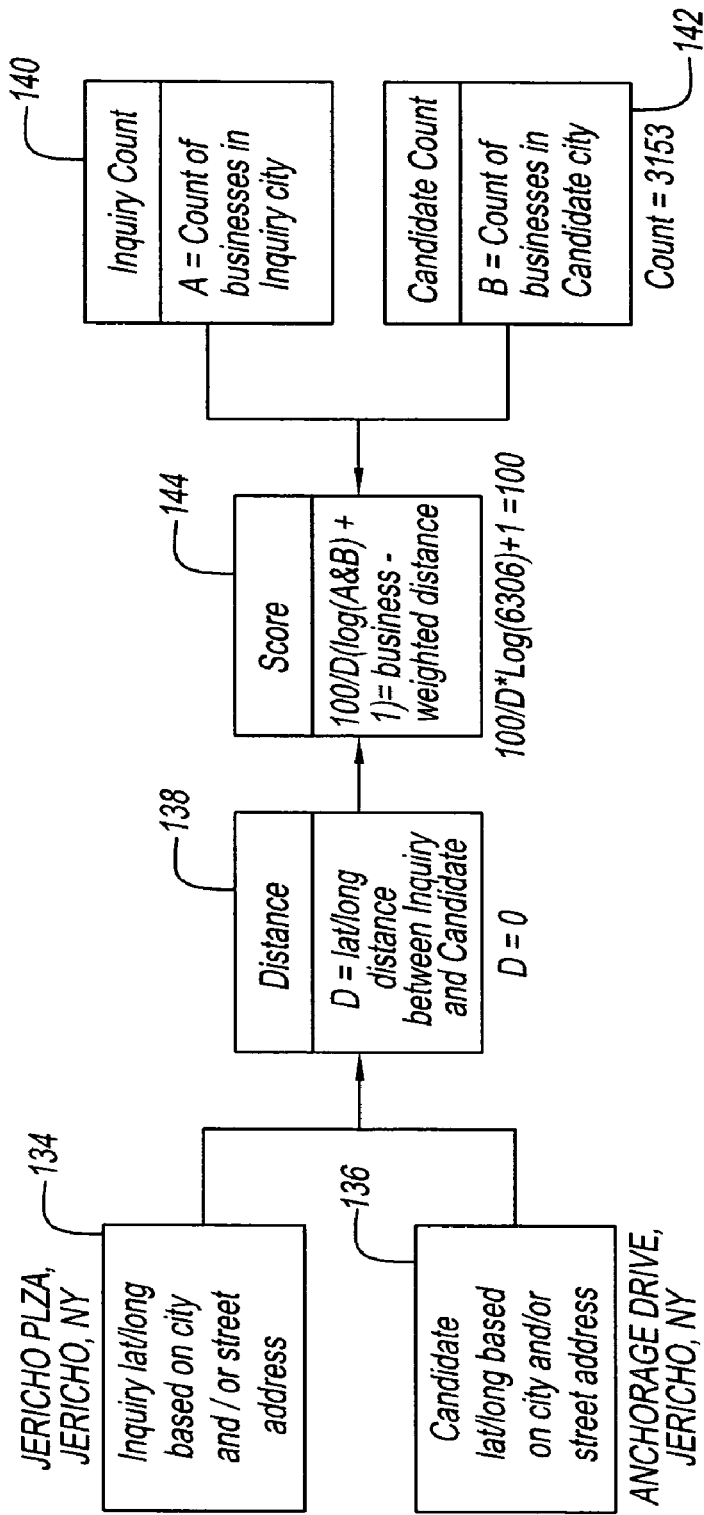
FIG. 14 is a block diagram of a latitude and longitude business density score model according to the present invention.

FIG. 14 is a block diagram that provides a latitude/longitude business density score which is useful to assess proximity when inquiry may contain errors in street address or city name which are more common in areas of high population density, e.g., northern New Jersey. In this type of scoring the inquiry latitude/longitude 134 based on city and/or street address is analyzed together with the candidate latitude/longitude 136 based on city and/or street address. The distance 138 is determined by the latitude/longitude distance between the inquiry and candidate. Simultaneously, the inquiry count (A) 140, i.e., count of businesses in the inquiry city, and the candidate count (B) 142, i.e., count of businesses in candidate city are scored 144 using the equation $100/D(\log(A+B)+1$ which is indicative of the business weighted distance.

Figure 15:
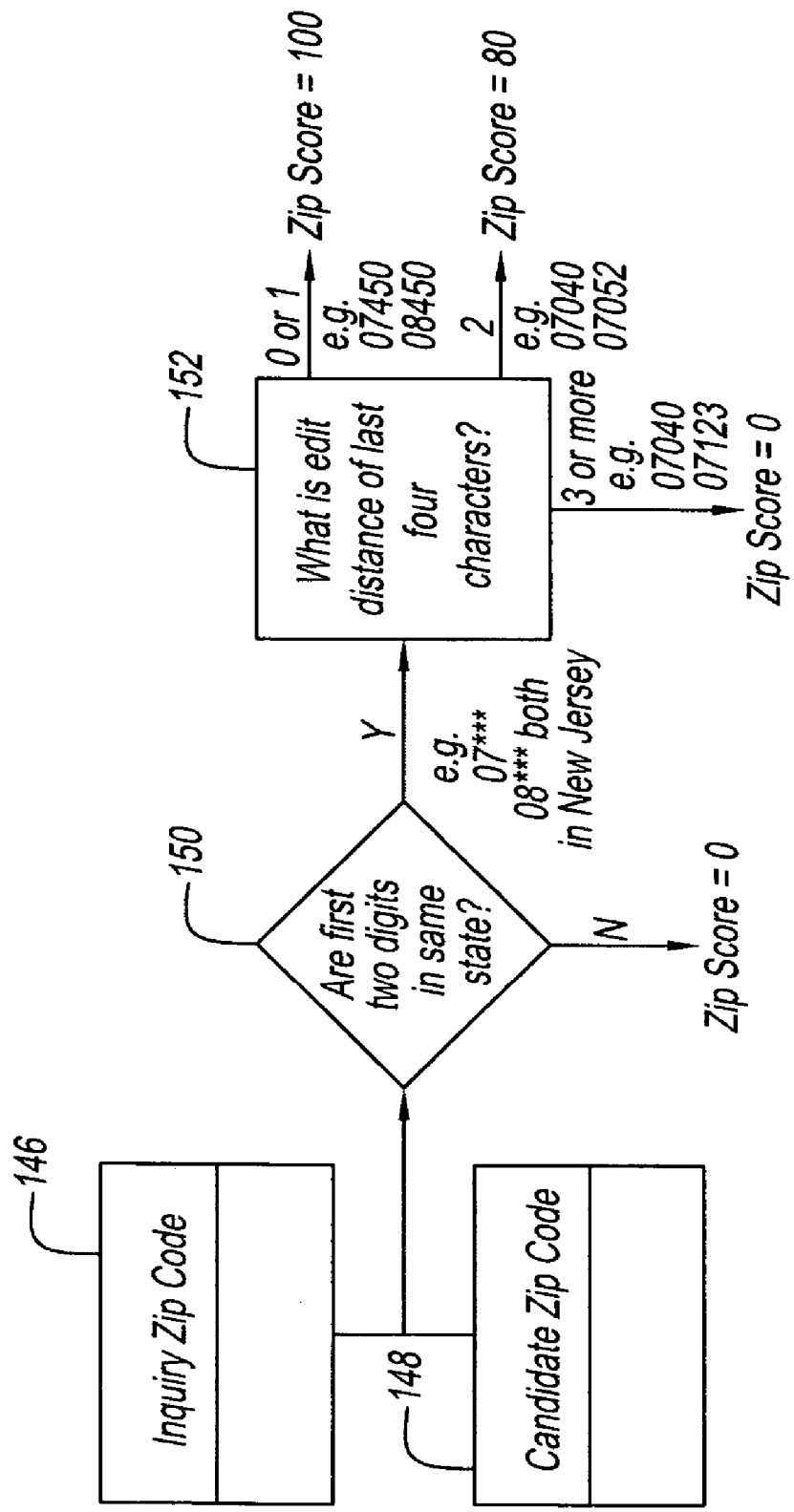
FIG. 15 is a block diagram of a zip score model according to the present invention.

Another scoring technique that is useful according to the present invention is zip scoring set forth in FIG. 15. Zip scoring is useful to improve match effectiveness when inquiry includes zip code but is otherwise incomplete or ambiguous. The logic diagram in FIG. 15 feeds an inquiry zip code 146 and a candidate zip code 148 into a decision tree 150. Decision tree 150 determines if the first two digits are in the same state for both the candidate zip code and the inquiry zip code. If not in the same state then zip score is zero. If they are both in the same state the two zip codes are sent to analyzer 152 which determines the edit distance of last four characters of each zip code. If the edit distance of last four characters of each zip code is 0 or 1 then the zip score is 100, if 2 then zip score is 80 if 3 or more than zip score is zero.

Figure 16:
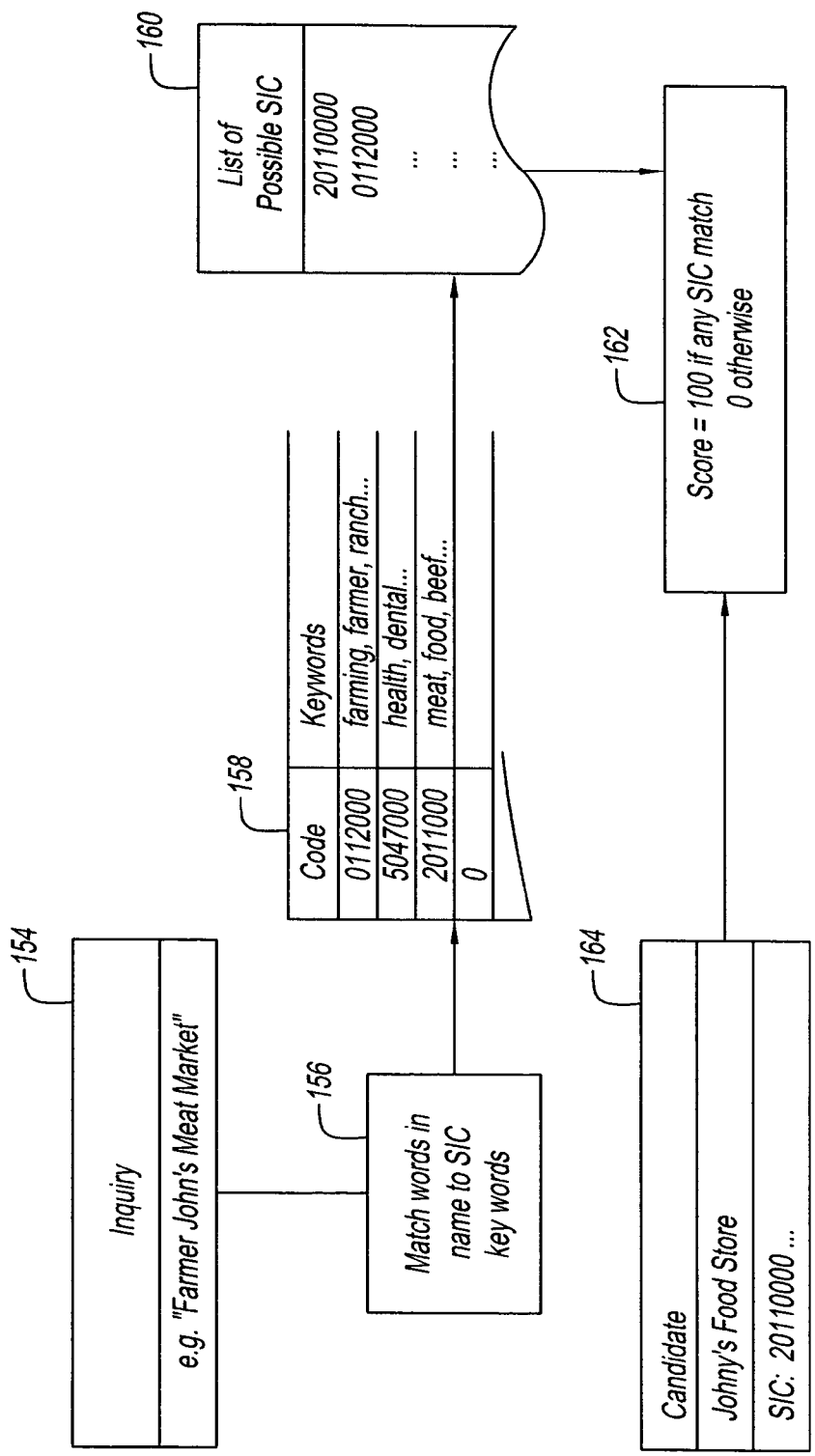
FIG. 16 is a block diagram of a industry score model according to the present invention.

FIG. 16 depicts an industry score which is useful to enhance match when business name is inaccurate. According to the industry scoring technique according to the present invention the inquiry 154, e.g., "farmer John's meat market" has its words matched 156 in name to SIC key words via reference table 158. A list of possible inquiry standard industry classifications (SIC's) 160 are generated and matched 162 with a similar list of possible candidate SIC's generated from 164, wherein the score is 100 if any SIC matches occur between the inquiry and candidate SIC's, otherwise the score is zero.

Figure 17:
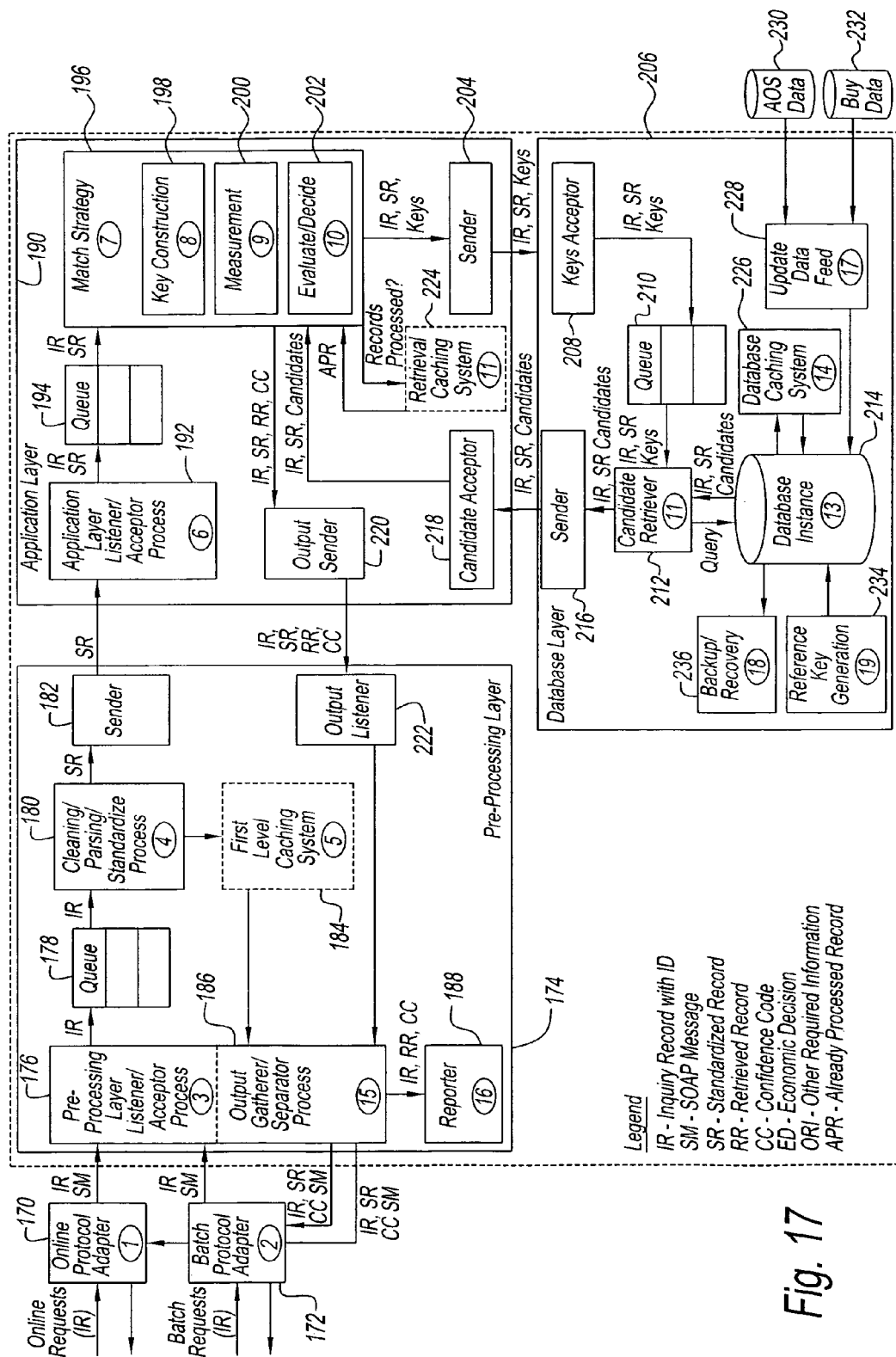
FIG. 17 is a block diagram of the application architecture according to the present invention.

FIG. 17 provides a block diagram of the application architecture according to the present invention. The use of extensive memory and asynchronous message queues enables the system to achieve high throughput, i.e., use of a standard web-service interface allows for easy interoperability with other systems. In its simplest detail, the application architecture of FIG. 17 includes online protocol adapters 170, 172 which receive online requests (IR) and batch requests (IR), respectively. These requests are sent to pre-processing layer 174 where they are processed in a pre-processing layer listener/acceptor processor 176, queue 178 and cleaning, parsing and standardize processor 180. The cleaned, parsed and standardized data is then either transmitted to sender 182 or first level caching system 184. If sent to system 184 then the information is then processed via output gatherer/separator 186 and then delivered to reporter 188. If sent to sender 182, then it proceeds to application layer 190 where it is processed by application layer listener/acceptor 192, queue 194 and match strategy 196. Match strategy 196 includes key construction 198, measurement 200 and evaluation and decision 202. Match strategy 196 transmits keys via sender 204 to database layer 206, which receives such keys via key acceptor 208. Key acceptor thereafter forwards such keys to database 214 via queue 210 to candidate retriever 212. Candidate retriever 212 also acts to retrieve candidate information from database 214 and thereafter transmit it to match strategy 196 via sender 216 and candidate acceptor 218. The match candidate output from match strategy 196 is returned to pre-processing layer 174 via output sender 220 where it is received by output listener 222 and then sent to output gatherer/separator 186. Additionally, output from match strategy 196 is transmitted to retrieval caching system 224 which has a memory centric architecture which reduces candidate retrieval time. Database 214 receives data from database caching system 226, update data feed 228 and AOS data 230, buy data 232 and reference key generator 234. Database 214 is connected to backup/recovery system 236 to protect against any data loss.

The invention having been thus described with particular reference to the preferred forms thereof, it will be obvious that various changes and modifications may be made therein without departing from the spirit and scope of the invention as defined in the appended claims.

What is claimed is:

1. A method comprising:
   receiving input data having a plurality of elements;
   converting selected elements in said plurality of elements to a set of terms;
   generating a plurality of keys from said set of terms;
   determining from stored data (a) optimization of said plurality of keys, thus yielding optimized keys, and (b) candidates that share a commonality with said optimized keys, thus yielding key intersections and a quantity for said key intersections;
   generating a cost function for said key intersections;
   prioritizing said key intersections according to said cost function, thus yielding cost-prioritized key intersections;
   retrieving match candidates in order of said cost-prioritized key intersections, and bounded by a pre-determined threshold and said quantity; and
   selecting a best match from said match candidates.

2. The method according to claim 1, wherein said converting step comprises:
   parsing said plurality of elements to identify said set of terms, including a company name and an address;
   cleaning said set of terms, including removing extraneous words; and
   standardizing said set of terms.

3. The method according to claim 2, wherein said converting step further comprises:
   validating said address having a street name and city name;
   correcting said street name and said city name, if necessary; and
   assigning a zip code, a latitude, and a longitude.

4. The method according to claim 3, wherein said converting step further comprises: maintaining at least one reference table.

5. The method according to claim 2, wherein said converting step further comprises:
   removing special characters in said set of terms;
   removing a last word in said company name if said last word is a standard company form;
   converting text in said set of terms to uppercase;
   depluralizing select text in said set of terms;
   standardizing select words in said set of terms;
   normalizing select phrases in said set of terms; and
   extracting a street number and a street name from said address.

6. The method according to claim 1, further comprising:
   generating a confidence score for each of said match candidates based on a degree of match.

7. The method according to claim 6, further comprising:
   providing an ordered list of selected match candidates based on said confidence score.

8. The method according to claim 6, wherein said confidence score is based on comparison scoring.

9. The method according to claim 8, wherein said comparison scoring step comprises:
   determining a score for a business name, a street name, and a city name in a pair, said pair being said set of terms and one of said match candidates;
   classifying said pair into data segments using a decision tree;
   performing logistic modeling using said data segments;
   determining a match probability for said pair; and
   assigning a grade to said pair.

10. The method according to claim 9, wherein said comparison scoring step further comprises:
    determining a uniqueness score based on a number of matching business names in said city name.

11. The method according to claim 9, wherein said comparison scoring step further comprises:
    calculating a business density score for said pair.

12. The method according to claim 9, wherein said comparison scoring step further comprises: calculating a zip score.

13. The method according to claim 9, wherein said comparison scoring step further comprises:
    calculating an industry score by matching words in said business name to standard industrial classification (SIC) key words.

14. A system comprising:
    (A) web services interface for accepting a match request and providing a best match;
    (B) pre-processing layer having a cleaning, parsing, and standardizing component for converting input data into a set of terms;
    (C) an application layer for:
       generating a plurality of keys from said set of terms,
       determining from stored data (a) optimization of said plurality of keys, thus yielding optimized keys, and (b) candidates that share a commonality with said optimized keys, thus yielding key intersections and a quantity for said key intersections;
       generating a cost function for said key intersections;
       prioritizing said key intersections according to said cost function, thus yielding cost-prioritized key intersections;
       obtaining match candidates in order of said cost-prioritized key intersections, and bounded by a pre-determined threshold and said quantity; and
       selecting said best match from said match candidates; and
    (D) a database layer for retrieving said candidates from stored business entity information for said application layer.

15. The system according to claim 14, wherein said application layer comprises:
    a decisioning component for determining a best match and an ordered list of said match candidates.

16. The system according to claim 15, wherein said web services interface also provides an ordered list of said match candidates from said application layer.

17. The system according to claim 14, further comprising:
- a plurality of memories in said pre-processing layer, said application layer, and said database layer;
- a plurality of asynchronous message queues in said pre-processing layer, said application layer, and said database layer; and
- a plurality of caching systems in said pre-processing layer, said application layer, and said database layer.

18. A computer readable medium comprising instructions for performing a method that includes:
- receiving input data having a plurality of elements;
- converting selected elements in said plurality of elements to a set of terms;
- generating a plurality of keys from said set of terms;
- determining from stored data (a) optimization of said plurality of keys, thus yielding optimized keys, and (b) candidates that share a commonality with said optimized keys, thus yielding key intersections and a quantity for said key intersections;
- generating a cost function for said key intersections;
- prioritizing said key intersections according to said cost function, thus yielding cost-prioritized key intersections;
- retrieving match candidates in order of said cost-prioritized key intersections, and bounded by a pre-determined threshold and said quantity; and
- selecting a best match from said match candidates.

19. The computer readable medium according to claim 18, wherein said converting step comprises:
- parsing said plurality of elements to identify said set of terms, including a company name and an address;
- cleaning said set of terms, including removing extraneous words; and
- standardizing said set of terms.

20. The computer readable medium according to claim 18, wherein said selecting step comprises:
- determining a score for a business name, a street name, and a city name in a pair, said pair being said set of terms and one of said match candidates;
- determining a uniqueness score based on a number of matching business names in said city name;
- calculating a business density score for said pair;
- calculating a zip score; and
- calculating an industry score by matching words in said business name to standard industrial classification (SIC) key words.

* * * * *